United States Patent [19]

Chen

[11] Patent Number: 5,287,218
[45] Date of Patent: Feb. 15, 1994

[54] RE-IMAGING OPTICAL SYSTEM INCLUDING REFRACTIVE AND DIFFRACTIVE OPTICAL ELEMENTS

[75] Inventor: Chungte W. Chen, Irvine, Calif.

[73] Assignee: Hughes Aircraft Company, Los Angeles, Calif.

[21] Appl. No.: 864,858

[22] Filed: Apr. 7, 1992

[51] Int. Cl.$^5$ .................. G02B 17/08; G02B 27/44; G02B 5/10
[52] U.S. Cl. .................. 359/365; 359/434; 359/565; 359/569; 359/858
[58] Field of Search .......... 359/362, 364, 365, 399, 359/423, 434, 558, 565, 566, 569, 724, 726, 727, 730, 857, 858, 861, 864

[56] References Cited

U.S. PATENT DOCUMENTS

| | | | |
|---|---|---|---|
| 3,897,133 | 7/1975 | Warner et al. | 359/365 |
| 4,265,510 | 5/1981 | Cook | 359/366 |
| 4,737,021 | 4/1988 | Korsch | 359/366 |
| 4,804,258 | 2/1989 | Kebo | 359/366 |
| 4,834,517 | 5/1989 | Cook | 359/366 |
| 4,895,790 | 1/1990 | Swanson et al. | 359/569 X |
| 4,964,706 | 10/1990 | Cook | 359/366 |
| 4,993,818 | 2/1991 | Cook | 359/366 |
| 5,009,494 | 4/1991 | Iossi et al. | 359/366 |
| 5,044,706 | 9/1991 | Chen | 359/571 |
| 5,153,772 | 10/1992 | Kathman et al. | 359/741 X |

FOREIGN PATENT DOCUMENTS

| | | | |
|---|---|---|---|
| 0156737 | 7/1986 | Japan | 359/365 |
| 91/12551 | 8/1991 | PCT Int'l Appl. | 359/565 |
| 0476147 | 12/1937 | United Kingdom | 359/365 |

OTHER PUBLICATIONS

Swanson, G. J. "Binary Optics Technology: The Theory and Design of Multilevel Diffractive Optical Elements" Technical Report 854, M.I.T. Lincoln Laboratory, Aug. 14, 1989.

Hecht, Eugene *Optics*, 2nd Edition, Addison-Wesley Publishing Co. Reading MA, 1987 pp. 188–190, 196–198.

*Primary Examiner*—Bruce Y. Arnold
*Assistant Examiner*—David R. Parsons
*Attorney, Agent, or Firm*—Hugh P. Gortler; Michael W. Sales; W. K. Denson-Low

[57] ABSTRACT

A re-imaging optical system (10) has a reflective objective (12) providing an intermediate image of the object being viewed and a relay (14) including refractive (32, 62) and diffractive (34, 72) optical elements. The system is capable of re-imaging the intermediate image onto an image plane (16) with the characteristic advantages of reflective and refractive systems while eliminating their deficiencies.

11 Claims, 5 Drawing Sheets

RE-IMAGING OPTICAL SYSTEM INCLUDING REFRACTIVE AND DIFFRACTIVE OPTICAL ELEMENTS

BACKGROUND OF THE INVENTION

1. Technical Field

This invention relates to re-imaging optical systems and, more particularly, to a catatrioptric re-imaging optical system utilizing reflective, refractive, and diffractive optical elements. 2. Discussion Re-imaging optical systems generally include two optical modules, an objective group and a relay group. The objective group precedes the intermediate image plane and the relay group follows the intermediate image. Re-imaging optical systems are key optical components in many optical sensors. Re-imaging optical systems also have unique properties. Some of their properties are better rejection of off axis radiation, one hundred percent cold shielding with the cold stop right next to the detector array, and an accessible entrance pupil.

Two examples of common re-imaging optical systems are all reflective three mirror anastigmats and catadioptric optical systems. Three mirror anastigmatic systems generally include two concave mirrors and one convex mirror. Therefore, two of the mirrors are positive and one is negative power. The advantage of a three mirror anastigmat is that it is of a simple optical design which has substantially no chromatic aberration and is generally, relatively speaking, less expensive to fabricate when compared to refractive optical systems. Unfortunately, it is difficult to avoid vignetting or central obscuration without jeopardizing the field of view coverage. The vignetting problem is particularly severe for the tertiary mirror. In order to clarify both the exit pupil and image planes from radiation reflected off the secondary mirror, before impinging on the tertiary mirror, either the line of sight is offset from the optical axis or the tertiary mirror is purposely tilted. Thus, the total usable field of view is limited.

While a catadioptric optical system experiences less vignetting and obscuration problems, they are generally more complicated. The complication is due to the requirement of chromatic aberration correction. To alleviate the chromatic aberration problem, the optical power of each refractive optical element is reduced. In many cases, the optical power of the refractive optical element group is insignificant as compared to that of the reflective optical element.

Thus, three mirror anastigmatic optical systems exhibit vignetting and observation problems, while catadioptric optical systems are complicated due to the requirements for chromatic aberration correction. The present invention provides an optical system which overcomes the above problems.

SUMMARY OF THE INVENTION

According to the teachings of the present invention, a system is provided which maintains favorable characteristics of reflective and refractive optical systems, while eliminating their disadvantages. The present invention provides an optical system including reflective, refractive and diffractive optical elements. This system not only preserves the advantages of reflective optical systems, such as wide field of view, broad spectral band width and low cost, but also has the advantage of catadioptric optical systems, such as compactness and long working distances to simplify focal plane assembly interface.

The present invention combines reflective, refractive and diffractive optical elements into a re-imaging optical system which maintains the favorable characteristics of each individual system while avoiding their disadvantages. The present system may be easily manufactured and is capable of wide field of view, wide spectral band width and is very compact and inexpensive. Thus, optical sensors constructed according to the teachings of the present invention are compact, have better image quality, and are easier to package and less expensive.

In the preferred embodiment, the re-imaging optical system includes first and second optical modules. The first module is an objective with a primary mirror. The primary mirror forms a radiant beam which includes an image of the object being viewed. The objective forms an intermediate image of the object being viewed. The second module is a relay which includes a secondary mirror and a refractive and diffractive optical element. The radiant beam received from the secondary mirror is passed through the refractive and diffractive optical elements to re-image the intermediate image onto an imaging plane.

BRIEF DESCRIPTION OF THE DRAWINGS

The various advantages of the present invention will become apparent to those skilled in the art after a study of the following specification and by reference to the drawings in which.

DETAILED DESCRIPTION OF THE PREFERRED EMBODIMENTS

Figure 1:
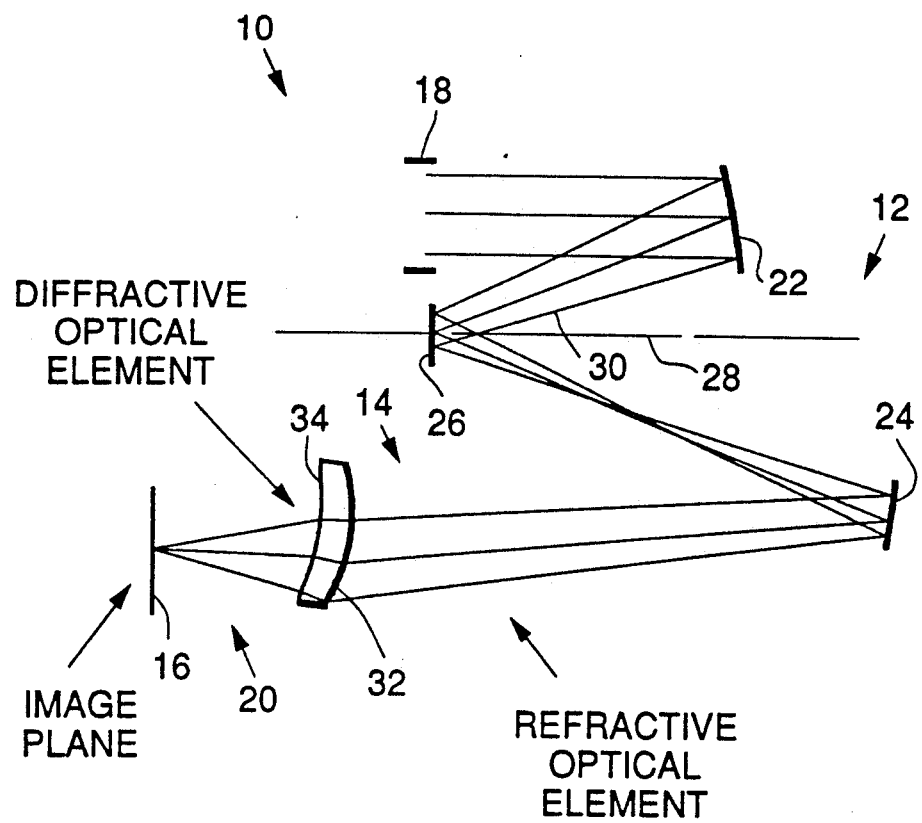
FIG. 1 is a diagrammatic side elevation view of an optical system in accordance with the teaching of the present invention.
Figure 2:
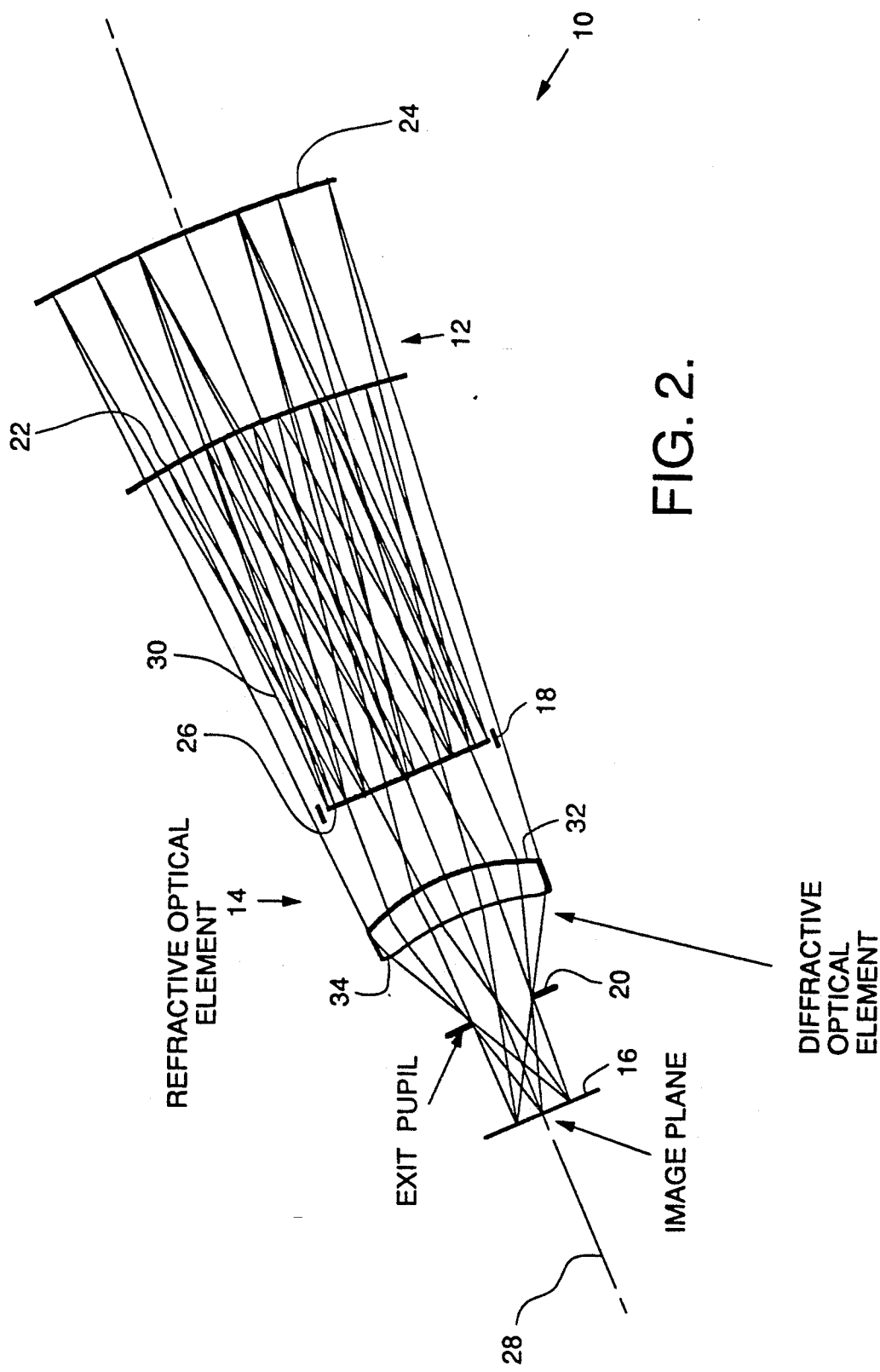
FIG. 2 is a diagrammatic top elevation view of the optical system of FIG. 1.

Referring to FIGS. 1 and 2, a re-imaging optical system is shown and designated with the reference numeral 10. The optical system includes an objective group 12 and a relay group 14 focusing the radiation beam of an object being viewed onto an image plane 16. Generally the radiation enters an entrance pupil 18 and exits an exit pupil 20, which is positioned between the relay group 14 and image plane 16.

The objective group 12 generally includes a primary mirror 22, a secondary mirror 24 and a fold mirror 26. The primary mirror 22 includes a central axis which defines the system optical axis 28. The primary mirror 22 is a positive power mirror and may be a conic or higher order aspheric mirror. The primary mirror 22 forms an intermediate image of the object being viewed.

The secondary mirror 24 is a positive power mirror and is positioned on axis with respect to the optical axis 28. The secondary mirror is a conic or higher order aspheric mirror.

The fold mirror 26 is a planar mirror. The fold mirror is positioned in the optical path of the beam 30 to fold the beam to make the system more compact.

The relay group 14 includes a refractive optical element 32 and a diffractive optical element 34. In FIGS. 1 and 2, the refractive and diffractive optical elements are a hybrid optical element, thus, a single element includes both a refractive and diffractive optical element. The refractive and diffractive optical elements are tilted 8.667 degrees and decentered 1.2077 inches with respect to the optical axis 28. In some applications, the hybrid optical element can be positioned on axis with respect to the optical axis.

The radiant beam 30 is received and reflected from the secondary mirror 24 and projected to the refractive and diffractive elements 32 and 34. As the beam passes through the refractive 32 and diffractive 34 elements, the intermediate image is re-imaged and passed to the image plane 16. The field curvature introduced by the primary 22 and secondary 24 mirrors is balanced by the refractive optical element. The refractive and diffractive optical elements both have a positive optical power. Thus, the positive optical power of all the optical elements provides for field curvature correction, reducing the overall size of the unit and also reducing the complexity of the system.

Figure 3:
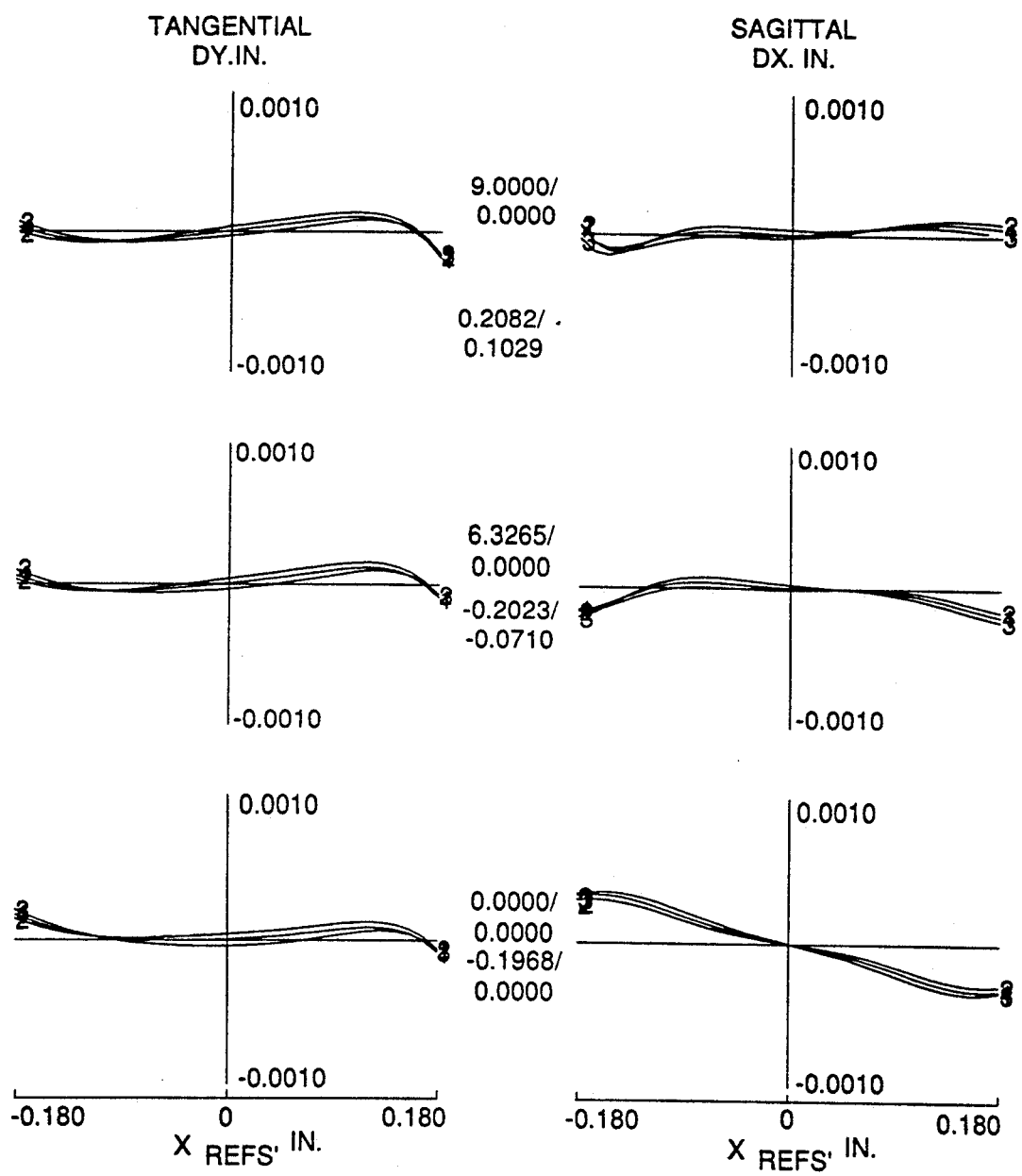
FIG. 3 is a schematic view of H-tanU curves of the optical systems of FIGS. 1 and 2.
Figure 4:
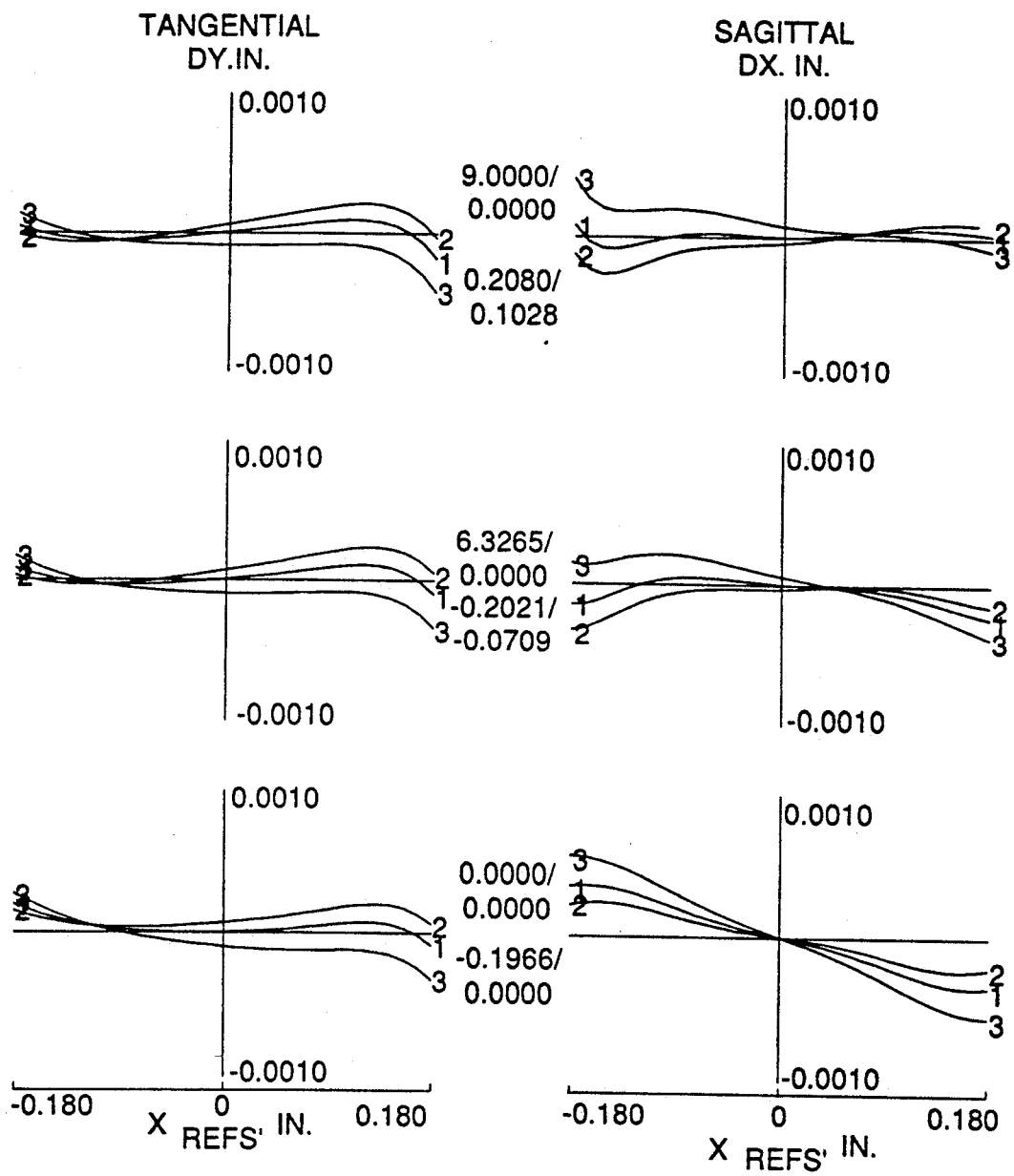
FIG. 4 is a schematic view of H-tanU curves of an optical system like that of FIGS. 1 and 2 without the diffractive optical element for chromatic aberration correction.

FIG. 3 is the H-tanU curves of the optical system shown in FIG. 1. H-tanU curves have been used by skilled optical designers to describe the geometric aberration of an optical system. Those curves in the left and right hand sides correspond to the tangential and sagittal geometric aberrations, respectively. The top, middle and bottom curves are the geometric aberrations at full field, 70% field and on-axis, respectively. The curves 1, 2 and 3 in each H-tanU plot are the geometric aberrations for the wavelengths of 3.8 μm, 3.6 μm and 4.2 μm, respectively. The wider the spread among the three colors, the worse the chromatic aberration. The H-tanu curves in FIG. 3 show practically no chromatic aberration. The chromatic aberration introduced by the refractive optical element is balanced out by the diffractive optical element. FIG. 4 is the H-tanU curves of a similar optical system except a diffractive optical element is not used on element 32 to correct the chromatic aberration. FIG. 4 shows a significant amount of chromatic aberration.

A specific prescription for a re-imaging optical system having the configuration illustrated in FIGS. 1 and 2 is given in the following table.

TABLE 1

| Element | Radius (inches) | CC | Decenter (inches) | Tilt (degrees) | Thickness (inches) |
|---|---|---|---|---|---|
| Primary Mirror | −2.91128 | <21.334 | 0 | 0 | 1.45564 |
| Secondary Mirror | −5.01035 | AD = −0.31987E-1  0.13114 | AE = 0.12248E-1  0 | 0 | 2.18400 |
| Fold Mirror | ∞ | AD = −0.35941E-2 | AE = 0.34629E-2 | | −2.60000 |

| Element | Glass Type | Radius of Curvature Front/Back | Distance/ Thickness (inches) | Aperture Diameter Front/Back |
|---|---|---|---|---|
| Refractive Element | silicon | −0.76910/−1.06629 | 0.1500 | 0.9/0.9 |
| Diffractive Element | $f(\rho) = 13.9906\rho^2 + 103.993\rho^4$ | | | |

AD and AE are the fourth order and sixth order aspheric coefficients
$f(\rho)$ is the grating phase equation of this diffractive optical element - the $n^{th}$ grating ring boundary is located where $\rho$ satisfies $f(\rho) = n$.
$\rho$ is the radial coordinate
(+) Radii have centers to the right
(−) Radii have centers to the left
(+) Thickness to the right
(+) Decenters are up
(+) Tilts are counterclockwise and in degrees
Decenters performed before tilts CC = $-\epsilon^2$ = −(Eccentricity)$^2$
Dimensions are given in inches
Reference Wavelength = 3.8 μm
Spectral Range = 0.8 μm It should be noted that the above prescription is an example for illustreative purposes and should not be consytrued in any way to limit the present invention.

Figure 5:
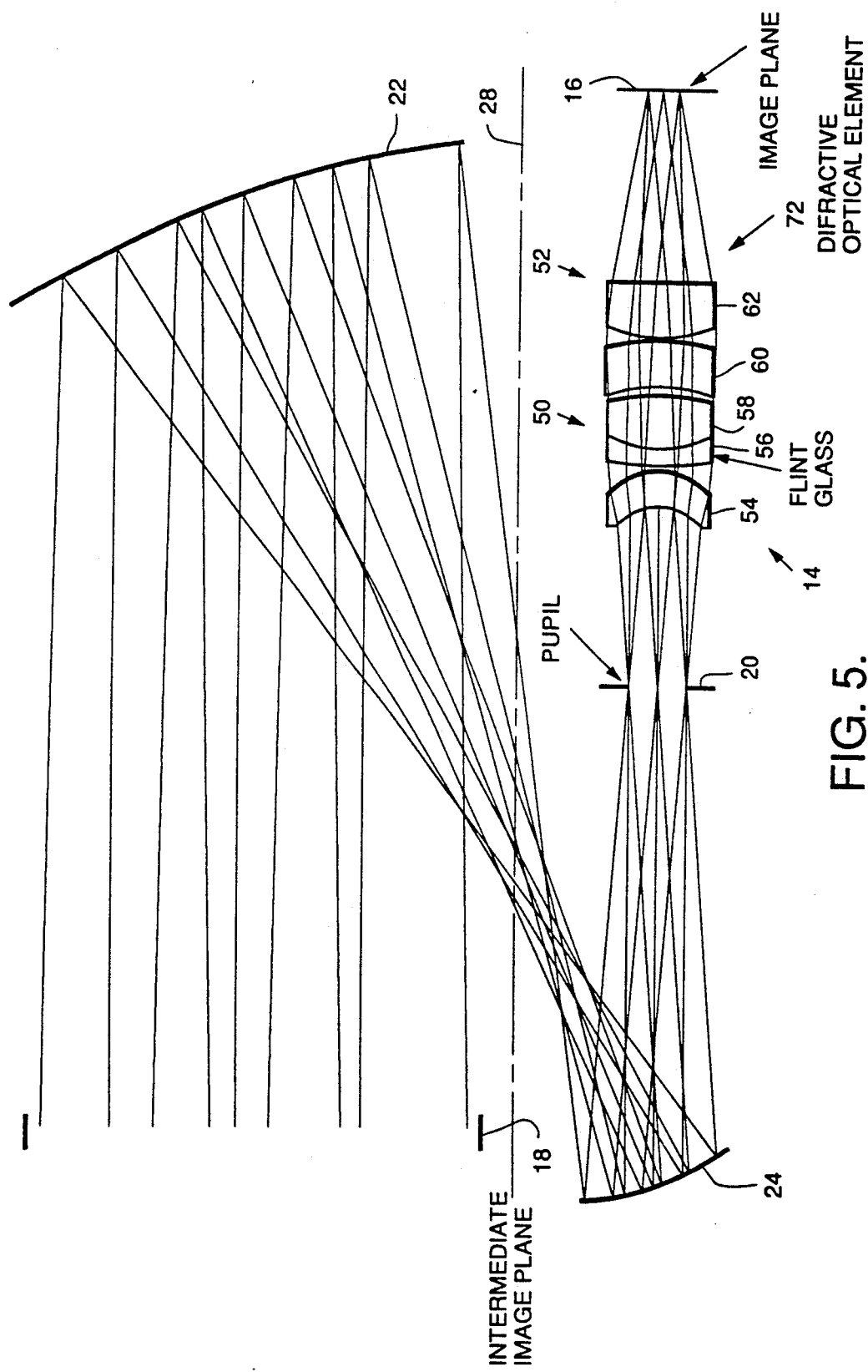
FIG. 5 is a diagrammatic side elevation view of a second embodiment of the present invention.

Turning to FIG. 5, another embodiment of the present invention is shown.

In FIG. 5, the primary and secondary mirrors 22 and 24 are like those previously described. However, the fold mirror has been eliminated. Thus, the beam 30 is reflected directly from the primary mirror 22 to the secondary mirror 24. Also, an intermediate image is formed between the primary and secondary mirrors.

Turning to the relay group 14, the refractive optical element group 50 and refractive-diffractive hybrid optical element 52 are different. Generally, this arrangement of refractive and hybrid optical elements is utilized for visible spectral band wavelengths.

The refractive optical element 50 includes a group of four refractive lenses. The lens group generally includes at least two different types of nominal glass materials, crown glass and flint glass. The lenses with positive optical power are crown glass, and the lenses with negative optical power are generally flint glass. The primary axial chromatic aberration introduced by the positive optical power lenses is balanced out by the combination of the negative flint glass and the diffractive optical element. The secondary axial chromatic aberration is corrected by balancing the optical power between the flint glass optical elements and the diffractive optical element. Since the primary axial and secondary axial chromatic aberrations are very well corrected, the stop shift introduced primarily lateral and secondary lateral chromatic aberrations are very small.

The refractive optical element illustrated includes lens 54, lens 56, lens 58 and lens 60.

Lens 54 defines an optical axis which runs through the vertex of the lens. Generally, lens 54 is a concave-convex lens formed from a crown glass material. Lens 54 has a predetermined radius of curvature on the concave or front surface of the lens and a predetermined radius of curvature on the convex or back surface of the lens. Also, lens 54 has a predetermined thickness at the vertex and predetermined aperture size on the concave front surface and the convex back surface.

Lens 56 is centered with respect to the optical axis. Generally this lens is a convex-concave lens formed from flint glass material. The lens 56 has a predetermined rate of curvature on the convex or front surface of the lens and a predetermined radius of curvature on the concave or back surface of the lens. The lens 56 has a predetermined thickness at its vertex and predetermined aperture sizes on the convex front and concave back surfaces.

The lens 58 is centered with respect to the optical axis. Generally the lens 58 is a biconvex lens formed from crown glass material. Generally the lens 58 has a predetermined radius of curvature on the convex or front surface of the lens and a predetermined radius of curvature on the convex or back surface of the lens. The lens 58 has a predetermined thickness at its vertex and predetermined aperture sizes on the convex front and convex back surfaces. Generally the lens 56 and lens 58 are adhered together by conventional means to form a doublet.

The lens 60 is centered with respect to the optical axis. Generally, the lens 60 is a concave-convex lens formed from crown glass material. The lens 60 has a predetermined radius of curvature on the concave or front surface of the lens and a predetermined rate of curvature on the convex or back surface of the lens. Also, the lens 60 has a predetermined thickness at the vertex and a predetermined aperture size on the concave front surface and the convex back surface.

The hybrid optical element 52 is centered with respect to the optical axis. The hybrid optical element 52 consists of a refractive optical element 62 and a diffractive optical element 72. Generally, the refractive optical element 62 is a convex-planar lens. Generally, the refractive optical element 62 has a predetermined radius of curvature on the convex or front surface. The refractive optical element 62 has a predetermined thickness at its vertex and predetermined aperture sizes on the convex front and planar back surfaces.

The diffractive optical element 72 is a zone plate pattern with the centers of the rings generally coinciding with the optical axis of the refractive optical element. The diffractive optical element, the zone plate pattern, is imprinted on the second surface of the refractive optical element 62. Although the second surface of the refractive optical element 62 can be either concave, convex or flat, a flat surface is generally preferred to simplify the fabrication processes of the diffractive optical element.

The exit pupil 20 is positioned between the secondary mirror 24 and the relay group 14. A specific prescription for a re-imaging optical system of FIG. 5 is given in the following table.

TABLE 2

| Element | Radius (inches) | CC | Decenter (inches) | Tilt (degrees) | Thickness (inches) |
|---|---|---|---|---|---|
| Primary Mirror | −12.200 | −1.000 | 0.75 | | 7.500 |
| Secondary | 2.800 | −1.000 | 0.75 | | 4.900 |

| Element | Glass Type | Radius of Curvature Front/Back | Distance/ Thickness (inches) | Aperture Diameter Front/Back |
|---|---|---|---|---|
| Lens 54 | BAK1 | −0.667328/−0.799550 | 0.250/0.036 | 0.8/0.96 |
| Lens 56 | SF56 | 4.17351/1.32472 | 0.120/0.00 | 1.0/1.0 |
| Lens 58 | LAK9 | 1.32471/−2.76912 | 0.380/0.065 | 1.0/1.0 |
| Lens 60 | LAKN7 | −1.90347/−2.68732 | 0.320/0.0198 | 1.0/1.0 |
| Lens 62 | LAKN7 | 1.69427/∞ | 0.394/0.00 | 1.0/1.0 |
| Diffractive Element | $f(\rho) = 269.81477\rho^2 - 22.83324\rho^4$ | | | |

$f(\rho)$ is the grating phase equation of this diffractive optical element - the $n^{th}$ grating ring boundary is located where $\rho$ satisfies $f(\rho) = n$
$\rho$ is the radial coordinate
(+) Radii have centers to the right
(−) Radii have centers to the left
(+) Thickness to the right
(+) Decenters are up
(+) Tilts are counterclockwise and in degrees
Decenters performed before tilts CC = $-\epsilon^2$ = −(Eccentricity)$^2$
Dimensions are given in inches
Reference Wavelength = 0.75 μm
Spectral Range = 0.30 μm It should be noted that the above prescription is an example for illustrative purposes and should not be construed in any way to limit the present invention.

The advantages provided by the examples of the preferred embodiment of the invention include the utilization of both reflective and refractive optical systems which provides their collective advantages and limits their deficiency. Thus, sensors constructed according to the teachings of the present invention are more compact, have better image quality and are easier to package while being relatively less expensive.

While it is apparent that the preferred embodiment is well calculated to fulfill the above stated objects, it will be appreciated that the present invention is susceptible to modification, variation and alteration without varying from the proper scope and fair meaning of the subjoined claims.

What is claimed is:
1. A re-imaging optical system comprising:
an objective including a primary and secondary mirror, said primary and secondary mirrors having conic or higher order aspheric surfaces, said pri- mary mirror receiving and projecting a radiation beam of a viewed object, said secondary mirror positioned to receive and reflect said radiation beam from said primary mirror, said primary mirror forming an intermediate image of said viewed object;

a relay means including a refractive optical element and a diffractive optical element positioned to receive said radiation beam from said secondary mirror to re-image said intermediate image onto an image plane.

2. The system according to claim 1 wherein a fold mirror is positioned between said primary and secondary mirrors for relaying said radiation beam to said secondary mirror.

3. The system according to claim 1 wherein said primary mirror and said secondary mirror are each positive power mirrors.

4. The ssytem according to claim 1 wherein said refractive and diffractive optical elements have positive optical power.

5. The system according to claim 1 wherein said refractive and diffractive optical elements are a single hybrid optical element.

6. The system according to claim 1 wherein said refractive optical element includes a pluraliyt of lenses.

7. The system according to claim 6 wherein said plurality of lenses includes positive and negative power lenses, the overall power of said plurality of lenses being positive.

8. The system according to claim 7 wherein an exit pupil is positioned between said secondary mirror and said plurality of lenses.

9. The system according to claim 6 wherein the combination of a group of crown-flint lenses and a refractive-diffractive hybrid optical element corrects primary and the secondary axial chromatic aberrations.

10. The system according to claim 6 wherein the combination of a group of crown-flint lenses and a refractive-diffractive hybrid optical element corrects primary and secondary lateral chromatic aberrations.

11. The system according to claim 1 wherein an exit pupil is positioned between said imaging plane and said diffractive optical element.

* * * * *